(12) United States Patent
Kobayashi et al.

(10) Patent No.: US 9,666,216 B1
(45) Date of Patent: May 30, 2017

(54) MAGNETIC RECORDING DEVICE AND MAGNETIC RECORDING METHOD

(71) Applicant: TDK Corporation, Tokyo (JP)

(72) Inventors: Tatsuhiro Kobayashi, Tokyo (JP);
 Sadaharu Yoneda, Tokyo (JP);
 Tsutomu Aoyama, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/181,490

(22) Filed: Jun. 14, 2016

(51) Int. Cl.
 *G11B 27/36* (2006.01)
 *G11B 5/39* (2006.01)
 *G11B 5/09* (2006.01)
 *G11B 5/17* (2006.01)
 *G11B 5/00* (2006.01)

(52) U.S. Cl.
 CPC .............. *G11B 5/3909* (2013.01); *G11B 5/09* (2013.01); *G11B 5/17* (2013.01); *G11B 2005/0024* (2013.01)

(58) Field of Classification Search
 CPC ........... G11B 5/012; G11B 27/36; G11B 5/02; G11B 2220/20; G11B 20/10009; G11B 5/09; G11B 2220/90; G11B 2005/0021; G11B 5/314; G11B 5/3903
 USPC .......................... 360/313, 59, 25, 31, 39, 55
 See application file for complete search history.

(56) References Cited

U.S. PATENT DOCUMENTS 8,896,947 B2 * 11/2014 Koizumi .................. G11B 5/40
 360/31

FOREIGN PATENT DOCUMENTS

JP  2010-218598 A  9/2010
JP  2014-211933 A  11/2014

* cited by examiner

*Primary Examiner* — Nabil Hindi
(74) *Attorney, Agent, or Firm* — Posz Law Group, PLC

(57) ABSTRACT

A magnetic recording device includes a magnetic recording medium, a microwave assisted magnetic head having a main magnetic pole for generating a recording magnetic field, and a spin torque oscillator provided near the main magnetic pole for generating a microwave magnetic field, a recording current supply part for supplying a recording current to recording coils according to recording current waveform data, a drive current supply part for supplying a drive current to the spin torque oscillator, and a drive current control part for controlling supply of the drive current by the drive current supply part based on the data. Taking into consideration as an indicator whether a polarity reversal interval included in the data exceeds a threshold time, the drive current control part controls the drive current supply part so as not to substantially lower the quality of signals recorded on the magnetic recording medium.

14 Claims, 12 Drawing Sheets

MAGNETIC RECORDING DEVICE AND MAGNETIC RECORDING METHOD

FIELD OF THE INVENTION

The present invention relates to a magnetic recording device having a microwave assisted magnetic head, and a magnetic recording method.

BACKGROUND OF THE INVENTION

In the field of magnetic recording using a head and a medium, further improvement in performance of the magnetic recording medium and the magnetic head is demanded as the recording density of magnetic disc devices increases.

A magnetic recording medium is a discontinuous medium consisting of a set of magnetic grains. The magnetic grains each have a single-domain structure. Each recording bit on a magnetic recording medium consists of a plurality of magnetic grains. Therefore, in order to increase the recording density, the magnetic grains must be smaller and the borders between adjacent recording bits must be less uneven. However, as the magnetic grains become smaller, the magnetic grains are less thermally stable in association with their reduced volume.

A presumable measure to solve the above problem is to increase the magnetic anisotropy energy Ku of magnetic grains. However, an increase in the Ku leads to an increase in the anisotropic magnetic field (magnetic coercive force) of a magnetic recording medium. On the other hand, the upper limit of the recording magnetic field intensity of a magnetic head is largely determined by the saturation magnetic flux density of the soft magnetic material constituting the magnetic core within the head. Therefore, if the anisotropic magnetic field of a magnetic recording medium exceeds an acceptable value determined based on the upper limit of the recording magnetic field intensity, recording on the magnetic recording medium fails.

Currently, a proposed method of solving the above problem of thermal stability uses energy assisted recording in which assistive energy is provided to a medium during recording to lower the effective recording magnetic field intensity for a magnetic recording medium formed by a high Ku magnetic material. The recording system using a microwave magnetic field as the assistive energy source is called microwave assisted magnetic recording (MAMR) and is being proactively studied/developed for practical use.

In microwave assisted magnetic recording, a microwave magnetic field of a frequency corresponding to the effective magnetic field (Heff) for magnetization of the recording layer of a magnetic recording medium is applied in the medium in-plane direction, whereby magnetization precession is excited in the recording layer, and the recording capability of the magnetic head is assisted.

As an exemplary magnetic head using the microwave assisted magnetic recording method, as shown in FIG. 14, a magnetic head is proposed that includes a main magnetic pole 6' that generates a recording magnetic field for application to a magnetic recording medium 100', a trailing shield 7', and a spin torque oscillator (STO) 10' that is provided between them (write gap) and that has a multilayered a magnetic thin film structure, and a leading shield 8'. In the magnetic head, a microwave magnetic field $H_M$ in the in-plane direction is generated due to the self-excited oscillation of an STO 10', precession movement of the magnetization of the recording layer is induced by applying the microwave magnetic field $H_M$ to the magnetic recording medium 100', and magnetization reversal in the perpendicular direction in the recording layer is assisted.

In such a magnetic head, in general, a direct current (drive current) is always applied to the spin torque oscillator 10' while the writing operation is executed. The recording current waveform for generating a recording magnetic field $H_W$ from the main magnetic pole 6' in recording signals on the magnetic recording medium 100' using such a magnetic head usually includes relatively long polarity reversal intervals and relatively short polarity reversal intervals. Here, a polarity reversal interval means the interval from one polarity reversal time to the next polarity reversal time. There is a problem that the writing operation according to a recording current of a relatively long polarity reversal interval deteriorates the bit error rate (BER) of signals recorded on the magnetic recording medium 100. The BER deterioration is presumably caused by the returning magnetic field $H_R$ (the magnetic field in the opposite direction to the recording magnetic field), which is the recording magnetic field $H_W$ from the main magnetic pole 6' that returns and occurs near the end face on the ABS side of the trailing shield 7' as shown in FIG. 14. In other words, as the returning magnetic field $H_R$ and the microwave magnetic field $H_M$ generated from the spin torque oscillator 10' are applied to the magnetic recording medium 100' in a superimposed manner, problems such as deletion or deterioration of signals recorded on the magnetic recording medium 100' and reduced quality of recorded signals occur.

In order to solve the above problem, a microwave assisted magnetic head is proposed that controls the means for supplying a direct current to the spin torque oscillator to turn off the direct current to the spin torque oscillator when the number of times of polarity reversal (number of times of magnetization reversal) in a recording current waveform within a given time interval is equal to or lower than reference value, and to turn on the direct current to the spin torque oscillator when the number of times of magnetization reversal exceeds reference value (JP Laid-Open Patent Application No. 2014-211933).

In the above microwave assisted magnetic head, it is determined whether to turn on or off the direct current to the spin torque oscillator taking into consideration as an indicator the number of times of polarity reversal (number of times of magnetization reversal) in a recording current waveform within a given time interval. Therefore, depending on the setting of the given time interval for the recording current waveform, the direct current may be applied to the spin torque oscillator even in recording a signal corresponding to a relatively long polarity reversal interval, whereby it is difficult to solve the problem of lowered quality of signals recorded on a magnetic recording medium.

SUMMARY OF THE INVENTION

The objective of the present invention is to provide a magnetic recording device having a microwave assisted magnetic head and a magnetic recording method making it possible to prevent substantial deterioration in the quality of signals recorded on a magnetic recording medium.

In order to achieve the above objective, the present invention provides a magnetic recording device comprising a magnetic recording medium, a microwave assisted magnetic head having a main magnetic pole for generating a recording magnetic field to apply to the magnetic recording medium while recording signals on the magnetic recording medium and a spin torque oscillator provided near the main magnetic pole for generating a microwave magnetic field to apply to the magnetic recording medium in a superimposed manner on the recording magnetic field, a recording current supply part for supplying a recording current for generating the recording magnetic field from the main magnetic pole to recording coils for exciting the main magnetic pole according to recording current waveform data created based on the signals, a drive current supply part for supplying a drive current to the spin torque oscillator, and a drive current control part for controlling a supply of the drive current by the drive current supply part based on the recording current waveform data, wherein, the drive current control part controls the supply of the drive current by the drive current supply part to not substantially lower a quality of the signals recorded on the magnetic recording medium considering as an indicator whether a polarity reversal interval included in the recording current waveform data and defined as a time from one polarity reversal to a next polarity reversal exceeds a threshold time.

Here, "controlling supply of the drive current by the drive current supply part to not substantially lower a quality of signals recorded on a magnetic recording medium" means controlling supply of the drive current by the drive current supply part to improve in quality the signals recorded on a magnetic recording medium than the signals recorded on the magnetic recording medium without controlling a supply of the drive current by the drive current supply part, in other words with the drive current continuously supplied to the spin torque oscillator and a microwave magnetic field continuously applied in a superimposed manner.

In the above invention, when the polarity reversal interval included in the recording current waveform data exceeds the threshold time, the drive current control part may control supply of the drive current by the drive current supply part so that the microwave magnetic field is generated by the spin torque oscillator during the threshold time from a polarity reversal defining a start point of the polarity reversal interval, or may control supply of the drive current by the drive current supply part so that the microwave magnetic field is not generated by the spin torque oscillator from a polarity reversal defining a start point of the polarity reversal interval to a polarity reversal time defining an end point of the polarity reversal interval.

Moreover, in the above invention, when the polarity reversal interval included in the recording current waveform data exceeds the threshold time, the drive current control part may control supply of the drive current by the drive current supply part so that the current value of the drive current supplied by the drive current supply part is lower than the current value of the drive current supplied by the drive current supply part when the polarity reversal interval is equal to or shorter than the threshold time from a polarity reversal defining a start point of the polarity reversal interval to a polarity reversal time defining an end point of the polarity reversal interval.

Furthermore, in the above invention, when the polarity reversal interval included in the recording current waveform data exceeds the threshold time, the drive current control part may control supply of the drive current by the drive current supply part so that the microwave magnetic field is generated by the spin torque oscillator during the threshold time from a polarity reversal defining a start point of the polarity reversal interval, and controls that supply of the drive current by the drive current supply part so that a current value of the drive current supplied by the drive current supply part is lower than a current value of the drive current supplied by the drive current supply part when the polarity reversal interval is equal to or shorter than the threshold time until a polarity reversal defining an end point of the polarity reversal interval when the threshold time has ended.

In the above invention, it is preferable that the microwave assisted magnetic head further includes a trailing shield forming a magnetic path together with the main magnetic pole, the spin torque oscillator is provided in a write gap between the main magnetic pole and trailing shield, and the threshold time is one to three times a time for one recording bit on the magnetic recording medium to shift over a distance corresponding to the write gap.

In the above invention, it is preferable to further comprise a signal quality evaluation part for evaluating quality of signals recorded on the magnetic recording medium and a feedback information generation part for generating feedback information to feed back to the drive current control part based on evaluation by the signal quality evaluation part, wherein the feedback information generation part changes the threshold time based on the evaluation by the signal quality evaluation part and generates the feedback information including information regarding the changed threshold time.

Moreover, the present invention provides a magnetic recording method for recording signals on a magnetic recording medium using a microwave assisted magnetic head having a main magnetic pole for generating a recording magnetic field to apply to the magnetic recording medium while recording signals on the magnetic recording medium and a spin torque oscillator provided near the main magnetic pole for generating a microwave magnetic field to apply to the magnetic recording medium in a superimposed manner on the recording magnetic field, comprising a step of supplying a recording current for generating the recording magnetic field from the main magnetic pole to recording coils for exciting the main magnetic pole according to recording current waveform data created based on the signals and a step of supplying a drive current to the spin torque oscillator, wherein in the step of supplying a drive current, the drive current is controlled to not substantially lower a quality of the signals recorded on the magnetic recording medium considering as an indicator whether a polarity reversal interval included in the recording current waveform data and defined as a time from one polarity reversal to a next polarity reversal exceeds a threshold time.

In the above invention, when the polarity reversal interval included in the recording current waveform data exceeds the threshold time, the drive current may be controlled so that the microwave magnetic field is generated by the spin torque oscillator during the threshold time from a polarity reversal defining a start point of the polarity reversal interval, or the drive current may be controlled so that the microwave magnetic field is not generated by the spin torque oscillator from a polarity reversal defining a start point of the polarity reversal interval to a polarity reversal defining an end point of the polarity reversal interval.

In the above invention, it is possible that when the polarity reversal interval included in the recording current waveform data is equal to or shorter than the threshold time, the drive current having a given current value is supplied to the spin torque oscillator from a polarity reversal defining a start point of the polarity reversal interval to a polarity reversal time defining an end point of the polarity reversal interval, and when the polarity reversal interval exceeds the threshold time, the drive current having a current value lower than the current value of the drive current supplied when the polarity reversal time is equal to or shorter than the threshold time is supplied to the spin torque oscillator from a polarity reversal defining a start point of the polarity reversal interval to a polarity reversal time defining an end point of the polarity reversal interval.

In the above invention, it is possible that when the polarity reversal interval included in the recording current waveform data exceeds the threshold time, the drive current is supplied to the spin torque oscillator so that the microwave magnetic field is generated by the spin torque oscillator during the threshold time from a polarity reversal defining a start point of the polarity reversal interval, and the drive current having a current value lower than the current value of the drive current supplied when the polarity reversal interval is equal to or shorter than the threshold time is supplied to the spin torque oscillator until a polarity reversal defining an end point of the polarity reversal interval when the threshold time has ended.

In the above invention, it is preferable that the microwave assisted magnetic head further includes a trailing shield forming a magnetic path together with the main magnetic pole, the spin torque oscillator is provided in a write gap between the main magnetic pole and trailing shield, and the threshold time is one to three times a time for one recording bit on the magnetic recording medium to shift over a distance corresponding to the write gap.

In the above invention, it is preferable to further comprise a step of evaluating quality of signals recorded on the magnetic recording medium and a step of generating feedback information regarding control of the drive current based on the evaluation, wherein the feedback information includes information regarding the threshold time changed based on the evaluation.

The present invention can provide a magnetic recording device having a microwave assisted magnetic head and a magnetic recording method making it possible to prevent substantial deterioration in the quality of signals recorded on a magnetic recording medium.

DETAILED DESCRIPTION OF THE INVENTION

Prior to an explanation of an embodiment of the present invention, the terms used in this specification are defined. In a multilayer structure or element structure formed on an element forming surface of a slider substrate of the microwave assisted magnetic head according to this embodiment, viewed from a reference layer or element, the substrate side is referred to as "lower" and the opposite side is referred to as "upper." Moreover, viewed from a reference layer or element, the recording medium opposite surface side is referred to as "front" and the opposite side is referred to as "back" or "rear." Furthermore, in the microwave assisted magnetic head according to this embodiment, the "X-, Y-, and Z-axis directions" are defined in some figures as needed. Here, the Z-axis direction is the above-mentioned "vertical direction"; the +Z side corresponds to the trailing side and the −Z side corresponds to the leading side. Moreover, the Y-axis direction is the track width direction and the X-axis direction is the height direction.

[Configuration of Magnetic Recording Device]

Figure 1:
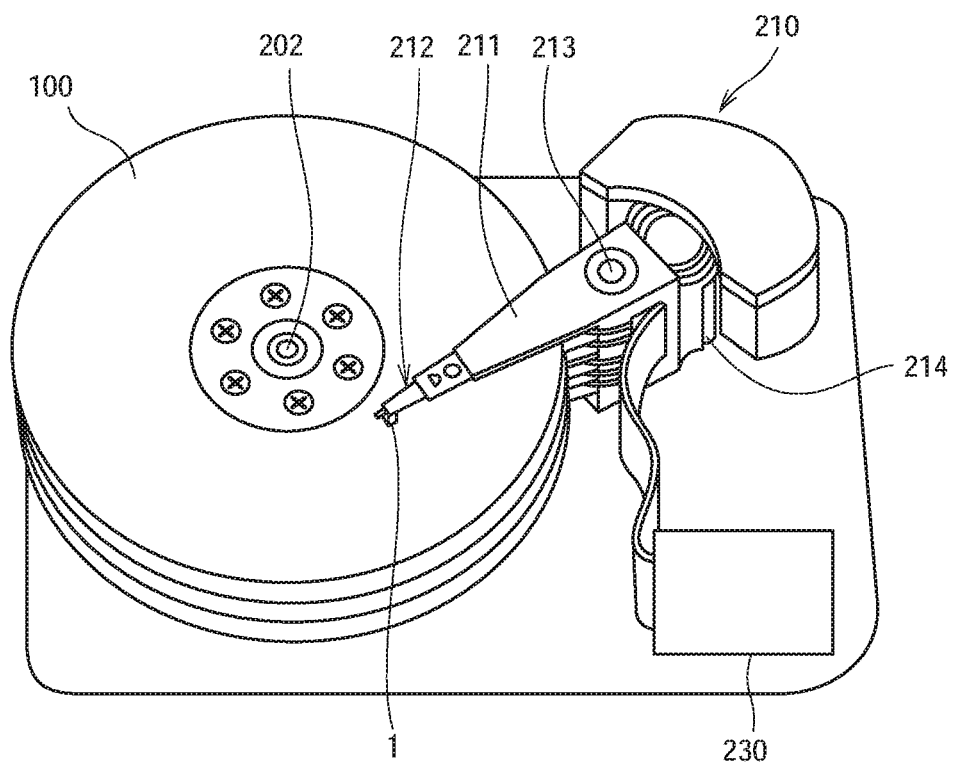
FIG. 1 is a perspective view schematically showing the magnetic recording device in according to an embodiment of the present invention.
Figure 2:
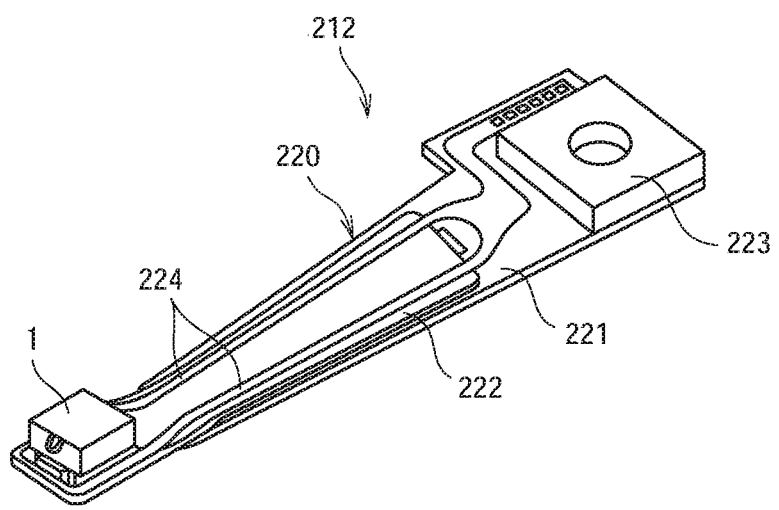
FIG. 2 is a perspective view schematically showing the head gimbal assembly (HGA) in the embodiment of the present invention.
Figure 3:
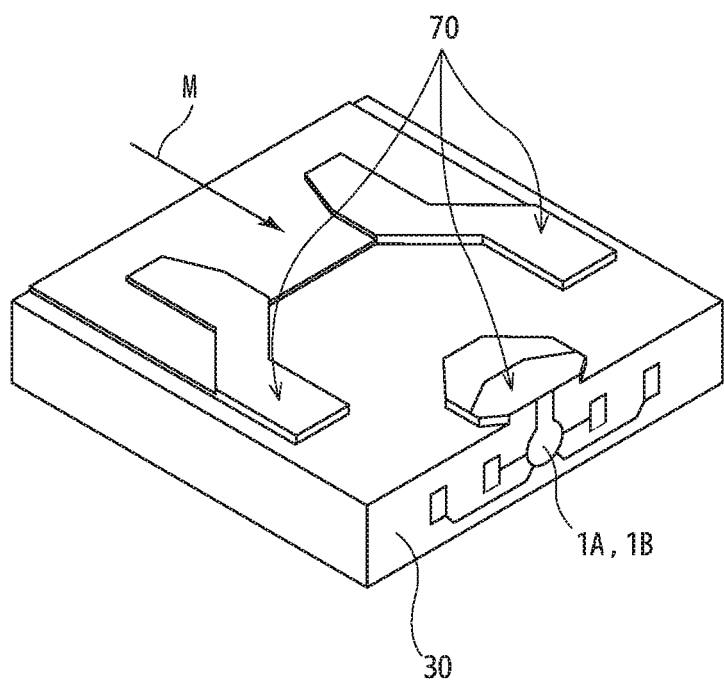
FIG. 3 is a perspective view schematically showing the entire structure of the microwave assisted magnetic head in the embodiment of the present invention.

FIG. 1 is a perspective view schematically showing the magnetic recording device in which a microwave assisted magnetic head according the present embodiment is mounted. FIG. 2 is a perspective view schematically showing a head gimbal assembly (HGA) including the microwave assisted magnetic head according the present embodiment. FIG. 3 is a perspective view schematically showing an entire configuration of the microwave assisted magnetic head according the embodiment.

As shown in FIG. 1, the magnetic recording device in the present embodiment includes a plurality of magnetic discs 100 rotating around a rotation shaft of a spindle motor 202, an assembly carriage device 210 provided with plurality of drive arms 211, head gimbal assemblies (HGAs) 212 attached to the front end portion of each drive arm 211 and each having a microwave assisted magnetic head 1, and a control circuit 230 controlling writing, reading, and the like of the microwave assisted magnetic heads 1. The control part 230 includes a microprocessor controlling the magnetic recording device and a drive control circuit of the microwave assisted magnetic heads 1.

In the present embodiment, the magnetic discs 100 as magnetic recording media are for perpendicular magnetic recording and have a structure in which, for example, a soft magnetic under layer, an intermediate layer, a magnetic recording layer (perpendicular magnetization layer), and the like are sequentially laminated on a disc substrate.

The assembly carriage device 210 is a device for positioning the microwave assisted magnetic heads 1 on the tracks of the magnetic discs 100 on which recording bits are arranged. In the assembly carriage device 210, the drive arms 211 are stacked in the direction along a pivot bearing shaft 213 and are angularly swingable about the pivot bearing shaft 213 by a voice coil motor (VCM) 214.

Here, the structure of the magnetic recording device in the present embodiment is not restricted to the above-described structure and may have a single magnetic disc 100, drive arm 211, HGA 212, and microwave assisted magnetic head 1.

In the head gimbal assembly 212 shown in FIG. 2, a suspension 220 has a load beam 221, flexure 222 fixed to the load beam 221 and having elasticity, and a base plate 223 provided at the base portion of the load beam 221. Moreover, a wiring member 224 including a lead conductor and connection pads electrically connected to both ends of the lead conductor is provided on the flexure 222. A magnetic head slider 30 (see FIG. 3) including the microwave assisted magnetic head 1 in the present embodiment is fixed to the flexure 222 at the front end portion of the suspension 220 to face the surface of each magnetic disc 100 with a predetermined space (flying height).

Furthermore, one end of the wiring member 224 is electrically connected to a terminal electrode of the microwave assisted magnetic head 1 in the present embodiment. The structure of the suspension 220 in the present embodiment is not restricted to the above described structure, either.

As shown in FIG. 3, the magnetic head slider 30 has an ABS (air bearing surface) 70 directly involved in the flying characteristic and includes the microwave assisted magnetic head 1 on a lateral end in the moving direction M of the magnetic dick 100 (the same direction as the air flow) (the rear lateral end in the moving direction M of the magnetic disc 100). The microwave assisted magnetic head 1 includes a recording head 1B and a reproducing head 1A.

[Configuration of Microwave Assisted Magnetic Head]

Figure 4:
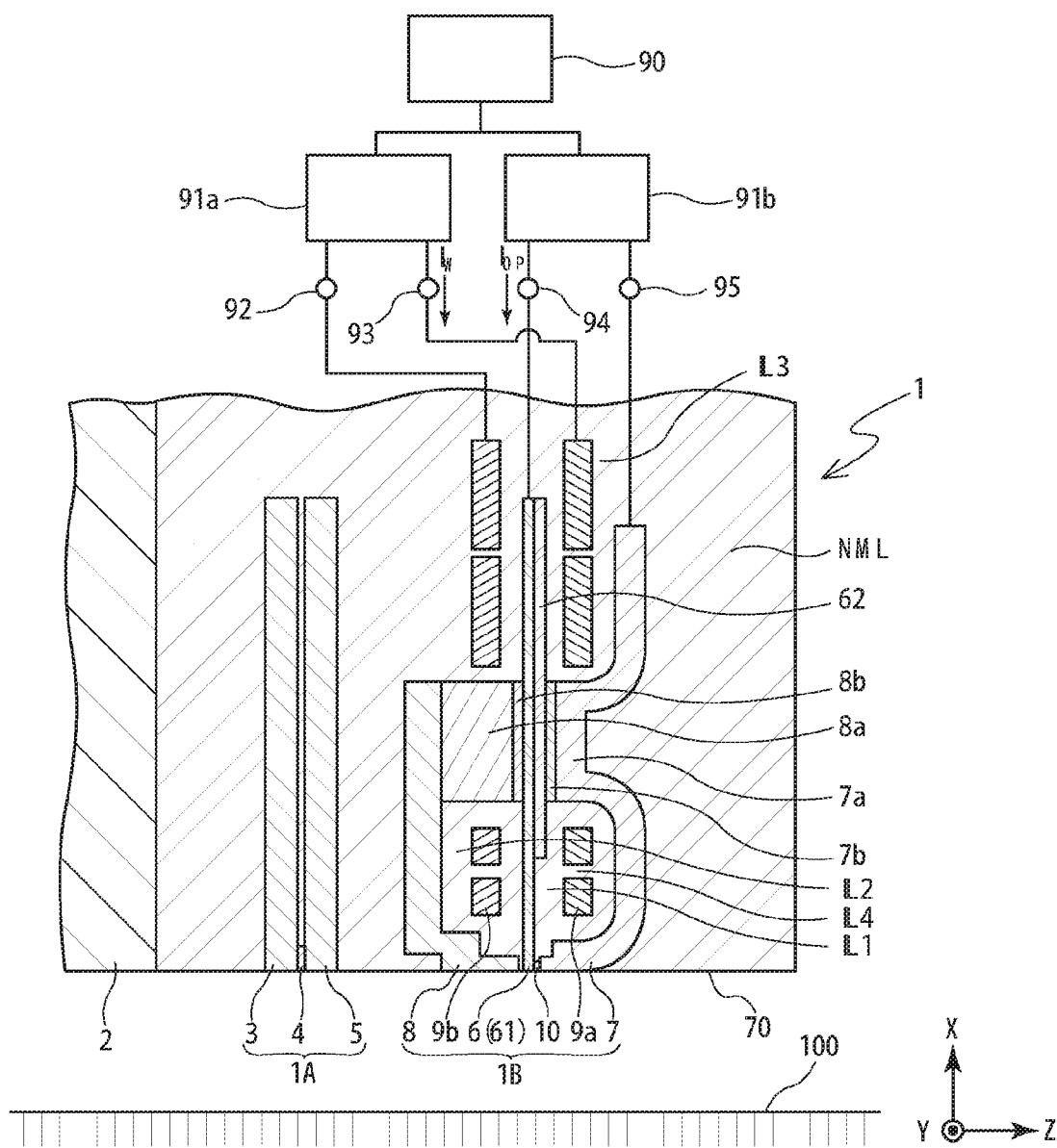
FIG. 4 is a cross-sectional view (XZ plane) schematically showing the configuration of the core part of the microwave assisted magnetic head in the embodiment of the present invention.

The microwave assisted magnetic head according to the present embodiment is described hereafter with reference to the drawings. FIG. 4 is a cross-sectional view (XZ plane) along the direction intersecting the ABS which is the air bearing surface of the microwave assisted magnetic head according to the present embodiment.

As shown in FIG. 4, the microwave assisted magnetic head 1 according to the present embodiment has a slider substrate 2 and the reproducing head 1A and the recording head 1B laminated/formed on the element forming surface of the slider substrate 2. Moreover, the microwave assisted magnetic head 1 include the ABS 70 that is the air bearing surface facing the magnetic disc 100.

The reproducing head 1A has an MR element 4 placed near the ABS 70 for detecting a signal magnetic field from the magnetic disc 100, and a lower shield layer 3 and upper shield layer 5 formed on the element forming surface of the slider substrate 2 and consisting of a magnetic material.

The lower shield layer 3 and upper shield layer 5 are provided primarily for preventing the MR element 4 from receiving external magnetic field that creates noise. The lower shield layer 3 and the upper shield layer 5 are magnetic layers consisting of a magnetic material and are formed by, for example, frame plating or sputtering. The lower shield layer 3 and upper shield layer 5 each are configured by a soft magnetic material such as NiFe (permalloy), FeSiAl (sendust), CoFeNi, CoFe, FeN, FeZrN, or CoZrTaCr or a multilayer film of these materials. The lower shield layer 3 and the upper shield layer 5 have a thickness of, for example, approximately 0.1 to 3 µm, respectively.

The MR element 4 is a magnetic sensor sensing a signal magnetic field using the MR effect and may be, for example, any of the following: a current in plane giant magneto-resistive (CIP-GMR) multilayer body using the in-plane conduction type giant magneto-resistive effect, a current perpendicular to plane giant magneto-resistive (CPP-GMR) multilayer body using the perpendicular conduction type giant magneto-resistive effect, and a tunneling magneto-resistive (TMR) multilayer body using the tunneling magneto-resistive effect.

The MR element 4 using the above MR effect can sense a signal magnetic field from the magnetic disc 100 with high sensitivity. When the MR element 4 is a CPP-GMR multilayer body or TMR multilayer body, the lower shield layer 3 and upper shield layer 5 can also function as electrodes. On the other hand, when the MR element 4 is a CIP-GMR multilayer body, insulating layers are provided between the MR element 4 and the lower shield layer 3 and between the MR element 4 and the upper shield layer 5, and an MR lead layer electrically connected to the MR element 4 is further provided.

The recording head 1B is for perpendicular magnetic recording and has a main magnetic pole layer 6, a trailing shield 7, a leading shield 8, a spin torque oscillator 10 situated in a gap (write gap) between the main magnetic pole layer 6 and trailing shield 7, a first coil 9a, and a second coil 9b.

The main magnetic pole layer 6 configures a magnetic guide for guiding magnetic flux generated by applying a recording current $I_W$ to the first coil 9a and second coil 9b to the magnetic recording layer (perpendicular magnetization layer) of the writable magnetic disc while converging the magnetic flux.

The main magnetic pole layer 6 extends backward in the height direction from the ABS 70 and includes a main magnetic pole part 61 and an auxiliary magnetic pole part 62. The main magnetic pole part 61 and auxiliary magnetic pole part 62 can be reversed in vertical position (in the Z direction) depending on the design specification.

Figure 5:
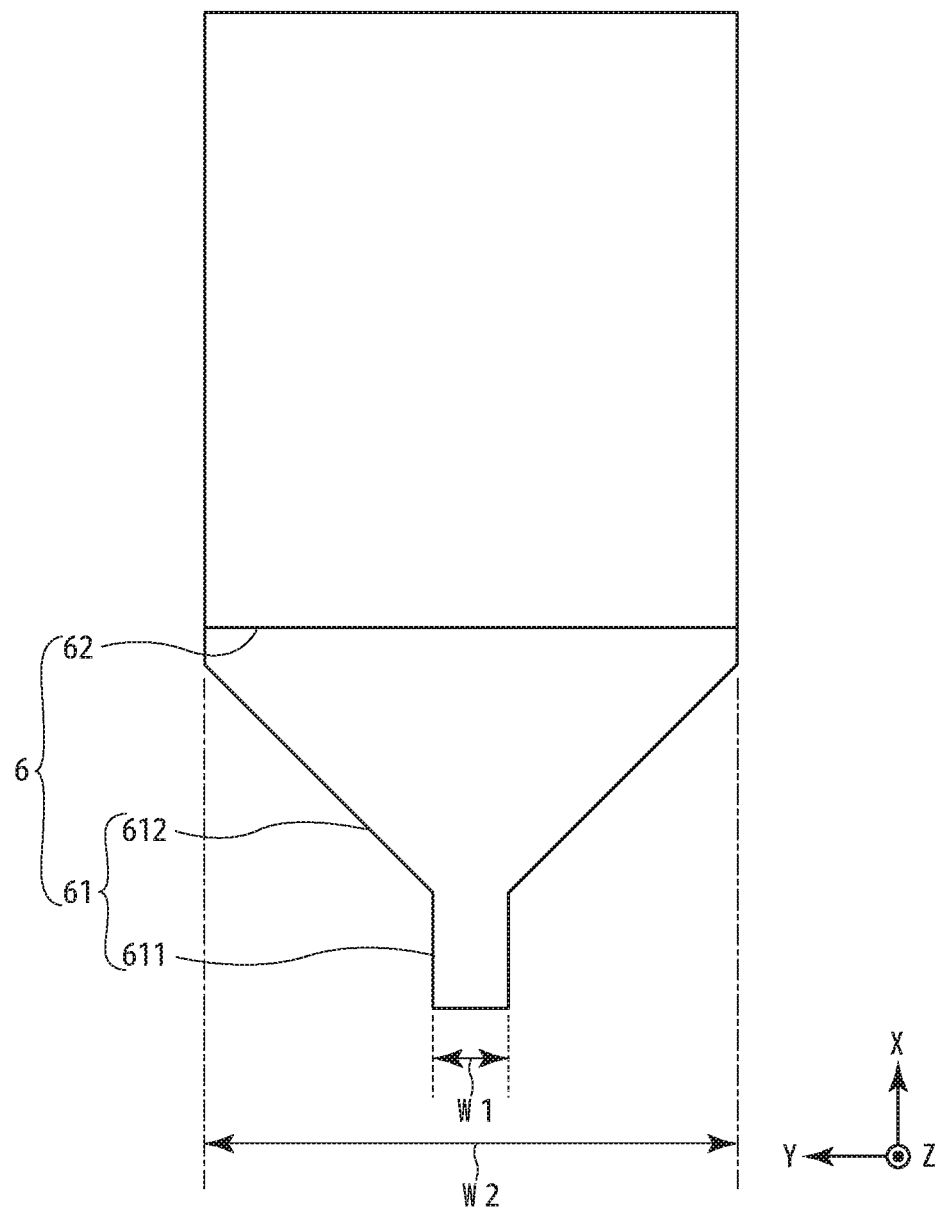
FIG. 5 is a plane view schematically showing the main magnetic pole layer in the recording head of the microwave assisted magnetic head in the embodiment of the present invention.

The auxiliary magnetic pole part 62 extends in the height direction from a position receded from the ABS 70. The auxiliary magnetic pole part 62 is placed, for example, on the trailing side with respect to the main magnetic pole part 61 and, as shown in FIG. 5, has a rectangular planar shape (width W2). The auxiliary magnetic pole part 62 can also be placed on the leading side of the main magnetic pole part 61 as mentioned above.

The main magnetic pole part 61 extends backward in the height direction. The main magnetic pole part 61 includes, for example, as shown in FIG. 5, a first magnetic pole part 611 that is narrow and that extends backward in the height direction from the ABS 70 and a second magnetic pole part 612 that is wide and continues backward from the first magnetic pole part 611.

The first magnetic pole part 611 is a substantial part to release magnetic flux and has a constant width W1 defining the recording track width. The second magnetic pole part 612 is a part to supply magnetic flux to the first magnetic pole part 611 and has a width W2 that is wider than the width W1 of the first magnetic pole part 611. The width W2 of the second magnetic pole part 612 is gradually narrowed in the front part in the height direction toward the first magnetic pole part 611. The first magnetic pole part 611 having a smaller width W1 makes it possible to generate a fine writing magnetic field and thus makes it possible to set the track width to a small value corresponding to a higher recording density.

Figure 7:
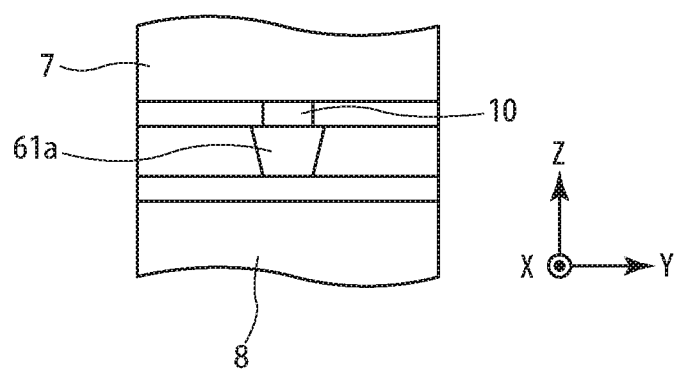
FIG. 7 is a partial enlarged cross-sectional view showing the schematic configuration near the ABS of the recording head of the microwave assisted magnetic head in the embodiment of the present invention.

The main magnetic pole part 61 has a so-called inverted trapezoidal end face 61a on the ABS 70, which is wider at the upper side (+Z side) than at the lower side (−Z side) and has the width that is decreased in the downward direction (−Z directionXsee FIG. 7).

The main magnetic pole layer 6 (main magnetic pole part 61 and auxiliary magnetic pole part 62) is configured by a soft magnetic material having a high saturation magnetic flux density and can be configured by, for example, a soft magnetic material such as an iron alloy material of which the main constituent is Fe (FeNi, FeCo, FeCoNi, FeN, FeZrN). The main magnetic pole part 61 and auxiliary magnetic pole part 62 may be formed as separate bodies and configured by different soft magnetic materials. For example, the main magnetic pole part 61 may be configured by a soft magnetic material having a higher saturation magnetic flux density than the auxiliary magnetic pole part 62.

Figure 6:
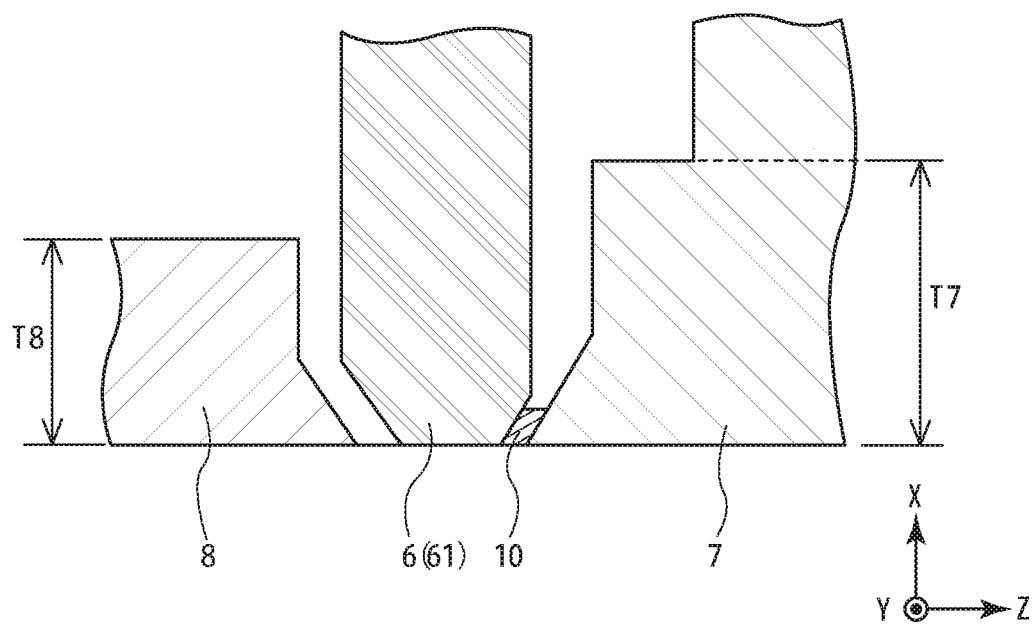
FIG. 6 is a plane view showing the schematic configuration of the recording head of the microwave assisted magnetic head in the embodiment of the present invention when seen from the ABS side.

The trailing side (+Z side) end face and leading side (−Z side) end face of the main magnetic pole part 61 near the ABS 70 are tapered so that the main magnetic pole part 61 has the thickness (the thickness in the Z direction) gradually reduced toward the ABS 70 (see FIG. 6). As a result, the recording magnetic flux emerging from the main magnetic pole part 61 (first magnetic pole part 611) can be converged more on the ABS 70.

The trailing shield 7 and the leading shield 8 have the function of receiving and spreading in the recording magnetic flux emerging from the main magnetic pole part 61. The trailing shield 7 reaches the ABS 70 and functions as a magnetic guide for the magnetic flux returning from the soft magnetic under layer provided below the recording layer (perpendicular magnetization layer) of the recording disc 100. The thicknesses (the minimum thicknesses in the height direction of the parts facing the ABS 70) T7 and T8 (see FIG. 6) of the trailing shield 7 and the leading shield 8 are, for example, approximately 0.05 to 1 μm. The trailing shield 7 and leading shield 8 can be configured by, for example, NiFe (permalloy) or the same Iron alloy material as the main magnetic layer 6 having a high saturation magnetic flux density.

The spin torque oscillator 10 for generating a microwave magnetic field that is superimposed on the recording magnetic field from the main magnetic pole layer 6 (main magnetic pole part 61) during writing is provided in the write gap between the main magnetic pole part 61 and trailing shield 7. The configuration of the spin torque oscillator 10 will be described in detail later.

In the back away from the ABS 70 in the height direction, a first back gap layer 7b is provided between the main magnetic pole layer 6 and trailing shield 7 and consists of an insulator electrically insulating them, and a second back gap layer 8b is provided between the main magnetic pole layer 6 and leading shield 8 and consists of an insulator electrically insulating them.

The first coil 9a and second coil 9b generate magnetic flux for magnetic recording on the magnetic disc 100 and are configured by, for example, a highly electrically conductive material such as copper (Cu). The first coil 9a and second coil 9b each have a winding structure (spiral structure) in which they are wound around coupling part 7a and 8a, the first back gap layer 7b and second back gap layer 8b, respectively. The first coil 9a and second coil 9b are configured to have a two-turn loop shape continuing from one to the other and have a front turn part nearly above insulating layers IL1 and IL2, respectively.

A non-magnetic layer NML is provided behind the front turn parts of the first coil 9a and second coil 9b in the height direction via an insulating layer IL3. The non-magnetic layer NML continues on the trailing shield 7 and reaches the ABS 70. The non-magnetic layer NML primarily functions as a protective layer.

In the present embodiment, the first coil 9a and second coil 9b have two turns. However, the number of turns is not restricted to this mode and can be set as appropriate within a range of 1 to 4 turns.

The first coil 9a and second coil 9b have a plurality of turns, and it is desirable that wound coil spaces are filled with an insulting layer IL4 of a dry film. The dry film insulating layer IL4 is preferably configured by a material such as alumina formed into a film by so-called CVD (chemical vapor deposition). In order to reliably fill/form the dry film insulating layer IL4 into coil spaces, the coil shape is particularly important, and it is particularly desirable that the coils do not have an inverse tapered shape in the depth direction.

A recording current supply part 91a is connected to the first coil 9a and second coil 9b via terminals 92 and 93, respectively. A drive current supply part 91b is connected to the main magnetic pole layer 6 (main magnetic pole part 61) and trailing shield 7 via terminals 94 and 95, respectively.

The configuration of the spin torque oscillator 10 will be described in detail with reference to FIG. 8.

Figure 8:
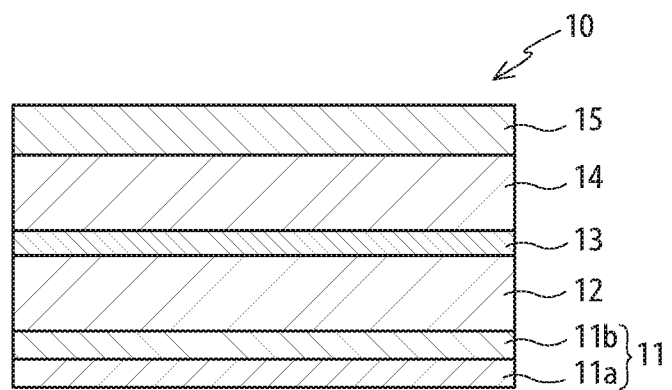
FIG. 8 is a cross-sectional view showing the schematic configuration of the spin torque oscillator in the embodiment of the present invention.

As shown in FIG. 8, the spin torque oscillator 10 is a multilayer element in which an under multilayer body 11 including a seed layer 11a and a buffer layer 11b, a spin injection layer 12, a non-magnetic spacer layer 13, a magnetic field generation layer 14, and a cap layer 15 consisting of Ru or the like and having a thickness of approximately 0.5 to 20 nm are laminated in this order. With a direct current flowing from the under multilayer body 11 to the cap layer 15, magnetization of the magnetic field generation layer 14 is subject to precession, whereby the spin torque oscillator 10 can generate a high frequency magnetic field (microwave magnetic field) from the magnetic field generation layer 14.

The seed layer 11a is, for example, an alloy layer having an amorphous structure or microcrystal structure including tantalum (Ta) and at least one other metal. Examples of the other metal include the Group 3d transition metals. Specifically, the other metal is at least one metal selected from a group consisting of vanadium (V), titanium (Ti), chromium (Cr), manganese (Mn), iron (Fe), nickel (Ni), and copper (Cu), and preferably iron (Fe), cobalt (Co) or nickel (Ni). The thickness of the seed layer 11a is preferably 0.4 to 5 nm and more preferably 0.8 to 3 nm.

The buffer layer 11b is an alloy layer having a [001] face oriented hexagonal close-packed structure and including at least one of the Group VI metals on the periodic table and at least one of the Group IX metals on the periodic table. Consisting of an alloy layer including a Group VI metal and a Group IX metal, the buffer layer 11b can have a [001] face oriented hexagonal close-packed structure and allow the spin injection layer 12 layered/formed on the buffer layer 11b to have excellent crystallizability and orientation properties and thus be a film excellent in orientation in spite of its thinness.

The Group VI metals constituting the buffer layer 11b include, for example, chromium (Cr), molybdenum (Mo), and tungsten (W), and the Group IX metals include, for example, cobalt (Co), rhodium (Rh), and iridium (Ir). It is preferable that the buffer layer 11b is an alloy layer including chromium (Cr) as a Group VI metal and cobalt (Co), rhodium (Rh), or iridium (Ir) as a Group IX metal among the above-described metals. The thickness of the buffer layer 11b is preferably 0.4 to 5 nm and more preferably 0.8 to 3 nm.

The spin injection layer 12 is a ferromagnetic layer having the magnetic anisotropy perpendicular to the film surface (perpendicular magnetic anisotropy) and consists of a multilayer film of magnetic materials or a multilayer film of magnetic and non-magnetic materials such as [CoFe/Ni]n, [Co/Pt]n, or [Co/Pd]n. Here, "n" is the number of repeats of the multilayer structure in the square brackets. Moreover, The spin injection layer 12 can consist of an alloy having the perpendicular magnetic anisotropy such as CoPt, FePt, and MnGa. When the spin injection layer 12 consists of [CoFe/Ni]n, it is preferable that the Ni film thickness is equal to or larger than the CoFe film thickness. The CoFe film thickness is preferably 0.1 to 1 nm and more preferably 0.1 to 0.4 nm. The Ni film thickness is preferably 0.2 to 1.5 nm and more preferably 0.2 to 0.6 nm. The number of repeats of the multilayer structure, n, is preferably 2 to 40 and more preferably 2 to 20. With a current flowing in the lamination direction of the spin torque oscillator 10, the spin injection layer 12 plays the role of spin-polarizing electrons and injecting the electrons into the magnetic field generation layer 14. The thickness of the spin injection layer 12 is preferably 0.6 to 15 nm and more preferably 1 to 10 nm. In order to increase the spin polarization rate by the spin injection layer 12, a magnetic material layer (not shown) having a high spin polarization rate may be present between the spin injection layer 12 and non-magnetic spacer layer 13. Particularly, when the spin injection layer 12 consists of [CoFe/Ni]n, it is preferable to have a magnetic material layer because Ni, which has a low spin polarization rate, is included. Examples of the material constituting such a magnetic material layer include soft magnetic alloys such as CoFe and CoFeB, Co-based Heusler alloys such as $Co_2MnSi$ and $Co_2FeSi$, and negative spin polarization materials such as FeCr and FeV. The thickness of the magnetic material layer is preferably 0.1 to 8 nm and more preferably 0.4 to 4 nm.

The non-magnetic spacer layer 13 may consist of a highly spin-permeable non-magnetic metal such as Cu, Ag, Au, Cr, and Al or may be a tunnel barrier layer such as a MgO layer or $Al_2O_3$ layer. The thickness of the non-magnetic spacer layer 13 is, for example, approximately 0.5 to 5 nm and more preferably approximately 1.5 to 3 nm. With the thickness of the non-magnetic spacer layer 13 falling within the above ranges, the state of exchange coupling between the spin injection layer 12 and magnetic field generation layer 14 can be optimized.

The magnetic field generation layer 14 is a ferromagnetic layer consisting of a material of which the magnetization direction is nearly parallel to the film surface in the initial state (the state in which no current flows and no magnetic field is applied). The intensity of the generated microwave magnetic field is increased as the magnetic field generation layer 14 has a higher saturation magnetization Ms (emu/$cm^3$) and has a larger thickness. Therefore, it is preferable that the magnetic field generation layer 14 consists of a material having a high saturation magnetization Ms and has a large thickness to a given extent of fitting in the write gap. The material constituting the magnetic field generation layer 14 includes, for example, soft magnetic materials such as [FeCo/Ni]m, FeCo, FeCoAl, FeCoSi, FeCoB, and FeNi, and CoIr and [Fe/Co]m having negative perpendicular magnetic anisotropy. Here, "m" is the number of repeats of the multilayer structure in the square brackets. When the magnetic field generation layer 14 consists of [FeCo/Ni]m, it is preferable that the FeCo film thickness is larger than the Ni film thickness, the FeCo film thickness is preferably 0.4 to 4 nm and more preferably 0.8 to 2 nm, and the Ni film thickness is preferably 0.1 to 1 nm and more preferably 0.1 to 0.5 nm. The number of repeats of the multilayer structure, m, is preferably 1 to 20 and more preferably 3 to 10. The thickness of the magnetic field generation layer 14 is approximately 2 to 20 nm and preferably approximately 5 to 15 nm.

[Action/Effect of Microwave Assisted Magnetic Head]

In the microwave assisted magnetic head 1 in this embodiment, magnetic flux generated as a result of a recording current being supplied from the recording current supply part 91a to the first coil 9a and second coil 9b is guided by the main magnetic pole layer 6 to the magnetic recording layer (perpendicular magnetization layer) of the magnetic disc 100 to write on while converging, whereby a recording magnetic field emerges from the end face 61a on the ABS 70 side of the main magnetic pole layer 6 (main magnetic pole part 61).

Concurrently, a drive current (direct current) $I_{OP}$ supplied from the drive current supply part 91b flows through the main magnetic pole layer 6 (main magnetic pole part 61), spin torque oscillator 10, and trailing shield 7 in this order. As the drive current $I_{OP}$ flows, magnetization of the spin injection layer 12 causes electrons to be spin-polarized. When the spin polarization rate of the spin injection layer 12 is positive, the spin electrons polarized in the opposite direction to the majority spin of the spin injection layer 12 are reflected on the spin injection layer and injected into the magnetic field generation layer 14. The reflected spin electrons act on the magnetization of the magnetic field generation layer 14 and induce magnetization precession of the magnetic field generation layer 14, whereby a microwave magnetic field is generated from the magnetic field generation layer 14. With this microwave magnetic field being superimposed on the recording magnetic field from the main magnetic pole layer 6, signals can be recorded on the magnetic disc 100 having a high magnetic anisotropy energy Ku.

Figure 12:
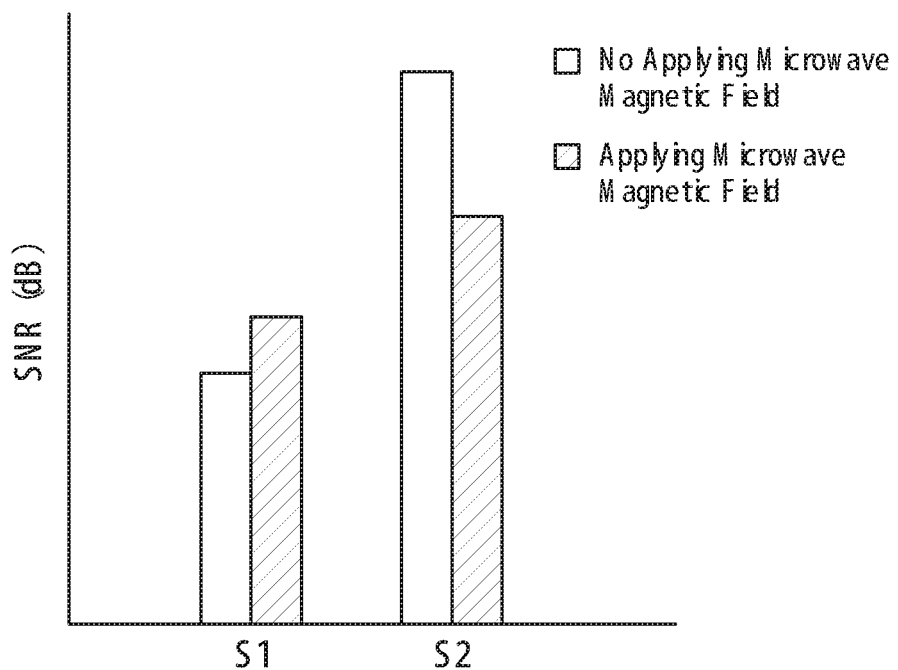
FIG. 12 is a graph for explaining the difference in the SN ratio between a signal recorded according to a relatively short polarity reversal interval and a signal recorded according to a relatively long polarity reversal interval depending on the presence/absence of a microwave magnetic field assist effect.
Figure 14:
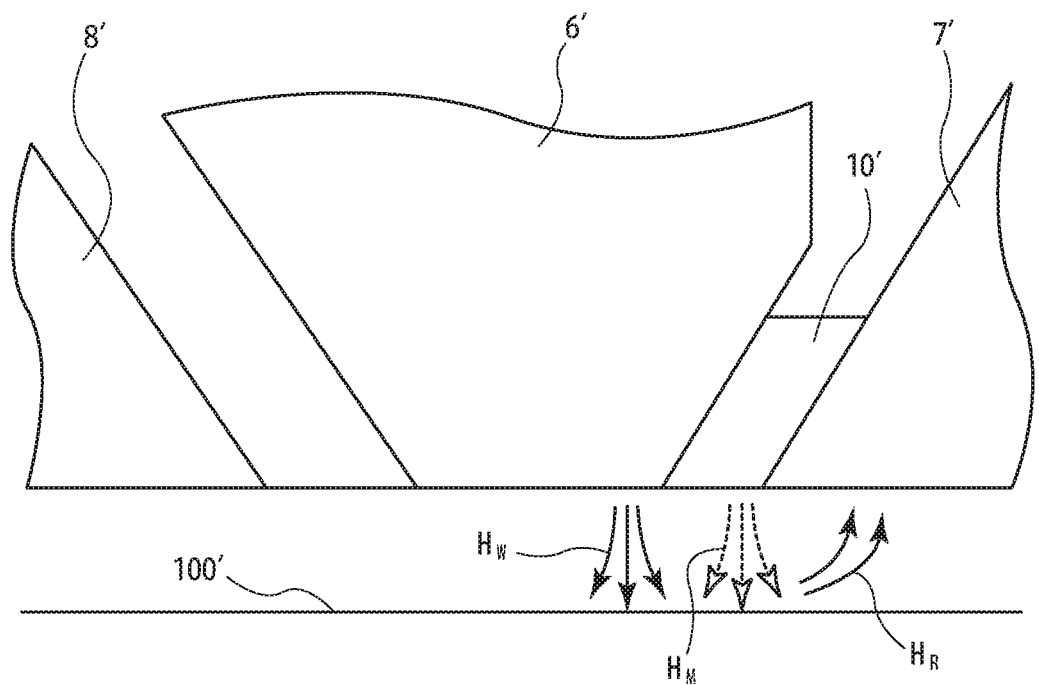
FIG. 14 is a cross-sectional view showing the schematic configuration of the prior art microwave assisted magnetic head.

Here, if a microwave magnetic field is constantly generated while signals are recorded, the problem that the microwave magnetic field assists the returning magnetic field that is the recording magnetic field returning to the trailing shield 7 (the magnetic field in the opposite direction to the recording magnetic field) and lowers the quality of signals recorded on the magnetic disc 100 (see the prior art microwave assisted magnetic head shown in FIG. 14) occurs. As described later, upon recording signals, a recording current is supplied from the recording current supply part 91a to the first coil 9a and second coil 9b according to recording current waveform data $D_{WW}$ (see FIG. 10A). The recording current waveform data $D_{WW}$ include multiple polarity reversal intervals $G_{PR}$ defined as from one polarity reversal to a next polarity reversal time. The recording current waveform data $D_{WW}$ is created according to signals to be recorded on the magnetic disc 100; therefore, the time intervals of the multiple polarity reversal intervals $G_{PR}$ included therein are not always the same. Generally, relatively short polarity reversal intervals $G_{PR}$ and relatively long polarity reversal intervals $G_{PR}$ are included. As presented by the graph shown in FIG. 12, a signal S1 recoded according to a relatively short polarity reversal interval $G_{PR}$ is recorded with a higher SN ratio when a microwave magnetic field is continuously generated during the polarity reversal interval $G_{PR}$ than when no microwave magnetic field is applied. However, a problem is that a signal S2 recorded according to a relatively long polarity reversal interval $G_{PR}$ has a lower SN ratio when a microwave magnetic field is continuously generated during the polarity reversal interval $G_{PR}$ than when no microwave magnetic field is applied.

Then, in this embodiment, substantial deterioration in quality of signals recorded on the magnetic disc 100 can be prevented by controlling generation of a microwave magnetic field with the control part 230 described below.

[Configuration of Control Part]

Configuration of the control part 230 will be described hereafter.

Figure 9:
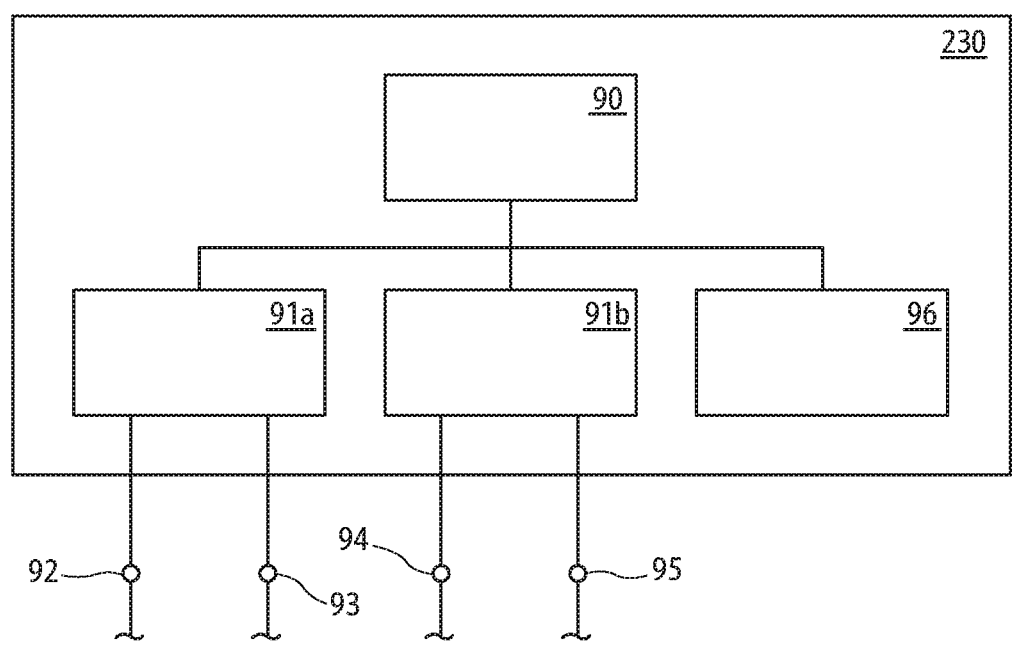
FIG. 9 is a block diagram showing the schematic configuration of the control part of the magnetic recording device according to the embodiment of the present invention.

As shown in FIG. 9, the control part 230 includes a current control part 90, a recording current supply part 91a, a drive current supply part 91b, and a recording signal circuit part 96. The recording signal circuit part 96 is a circuit included in the read/write channel included in the control part 230 and outputs recording signals to the current control part 90.

The current control part 90 controls generation and supply of a recording current $I_W$ and drive current $I_{OP}$ by the recording current supply part 91a and drive current supply part 91b.

Figure 10A:
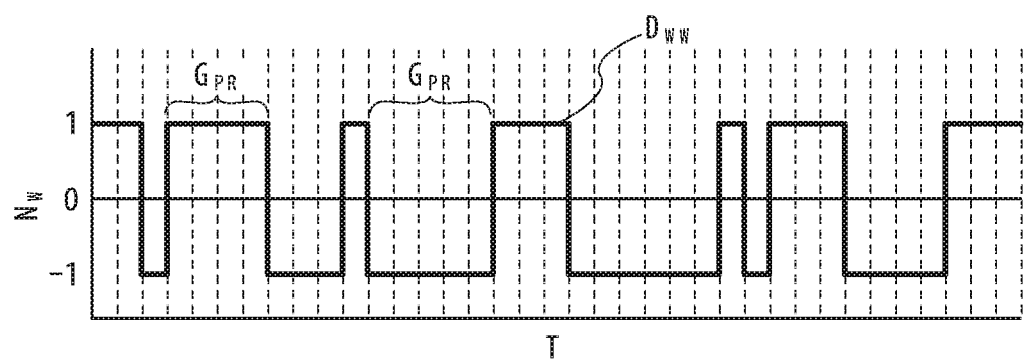
FIG. 10A is a waveform chart showing an example of the recording current waveform data created by the current control part in the embodiment of the present invention.

The control method by the current control part 90 is described. FIG. 10A is an output waveform chart showing an example of the recording current waveform data created by the current control part 90. FIGS. 10B to 10E are output waveform charts showing an example of the drive current waveform data created by the current control part 90. FIGS. 11A to 11E are waveform charts showing unit drive current waveforms created by the current control part 90. In FIGS. 10A to 11E, $N_W$ and $N_{OP}$ on the ordinate present the normalized current value of a recording current $I_W$ and the normalized current value of a drive current $I_{OP}$, respectively. The abscissa presents the time T.

First, the current control part 90 creates recording current waveform data $D_{WW}$ (see FIG. 10A) for the recording current supply part 91a to supply a recording current $I_W$ from recording signals entered via a user interface or the like (not shown) to record on the magnetic disc 100 based on a bit string consisting of the encoded recording signals. The recording current waveform data $D_{WW}$ are created as a square wave of which the polarity is reversed according to the code sequence in the bit string of recording signals. Generally, the recording current waveform data $D_{WW}$ includes multiple polarity reversal intervals $G_{PR}$ having various time intervals.

Then, the current control part 90 creates drive current waveform data $D_{OPW}$ (see FIGS. 10B to 10E) for the drive current supply part 91b to generate and supply a drive current $I_{OP}$ based on the recording current waveform data $D_{WW}$.

In this embodiment, taking into consideration as an indicator whether a polarity reversal intervals $G_{PR}$ (see FIG. 10A) in the recording current waveform data $D_{WW}$ exceed a threshold time TH, in other words determining whether a polarity reversal intervals $G_{PR}$ exceed a threshold time TH, the current control part 90 creates the drive current waveform data $D_{OPW}$ (see FIGS. 10B to 10E) based on the determination results. Here, it is preferable that the threshold time TH is, for example, one to three times the time for one recording bit on the magnetic disc 100 to shift over the distance corresponding to the write gap (the distance in the down track direction).

Specifically, the current control part 90 creates a unit drive current waveform $U_{OP}$ corresponding to each polarity reversal interval $G_{PR}$ in the recording current waveform data $D_{WW}$ and connects the unit drive current waveforms $U_{OP}$ in sequence to create drive current waveform data $D_{OPW}$.

Figure 11A:
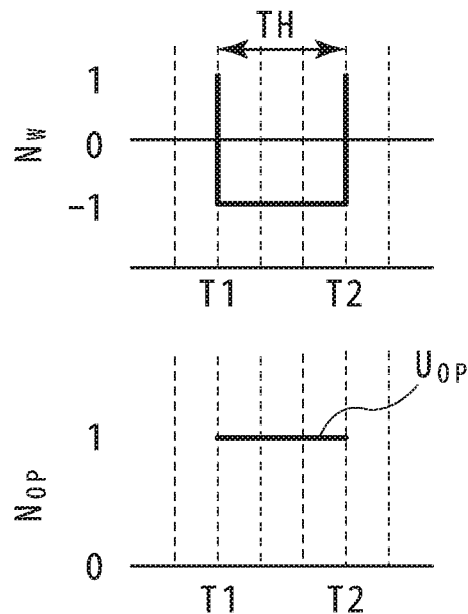
FIGS. 11A to 11E are output waveform charts showing an example of the unit drive current waveforms generated by the current control part and their original portions for one polarity reversal interval in the recording current waveform data in the embodiment of the present invention.

For example, as shown in FIG. 11A, when it is determined that the polarity reversal interval $G_{PR}$ from a polarity reversal time T1 to a polarity reversal time T2 is within a threshold time TH, a unit drive current waveform $U_{OP}$ that can generate a given drive current $I_{OP}$ is created. This drive current $I_{OP}$ has a current value necessary for generating from the spin torque oscillator 10 a microwave magnetic field having a magnetic field intensity enough to effectively assist the signal recording when superimposed on the recording magnetic field from the main magnetic pole layer 6 (main magnetic pole part 61). In other words, the unit drive current waveform $U_{OP}$ corresponding to this polarity reversal interval $G_{PR}$ is created as a unit square waveform $U_{OP}$ meaning that a given drive current $I_{OP}$ is supplied during the polarity reversal interval $G_{PR}$.

On the other hand, when it is determined that the polarity reversal interval $G_{PR}$ from the polarity reversal time T1 to the polarity reversal time T2 exceeds the threshold time TH, a unit drive current waveform $U_{OP}$ that can generate a drive current $I_{OP}$ that does not substantially lower a quality of the signals recorded on the magnetic disc 100 is created.

Figure 11B:
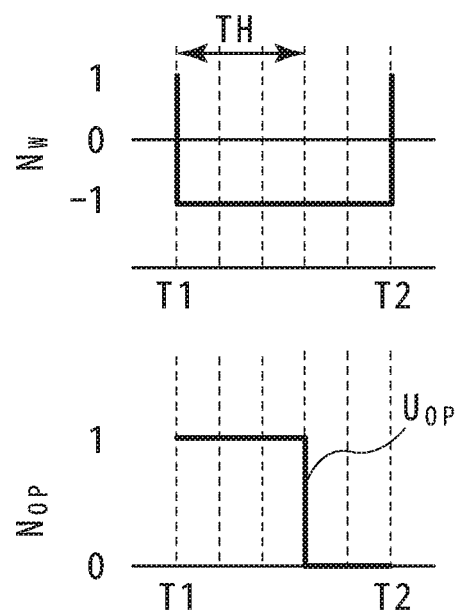

For example, the unit drive current waveform $U_{OP}$ corresponding to the above polarity reversal interval $G_{PR}$ is created as a unit square waveform $U_{OP}$, meaning that a given drive current Iop is supplied during the threshold time TH from the polarity reversal time T1 defining the start point of the polarity reversal interval $G_{PR}$ and then no drive current $I_{OP}$ is supplied until the polarity reversal time T2 defining the end point of the polarity reversal interval $G_{PR}$ (see FIG. 11B). The drive current $I_{OP}$ supplied during the threshold time TH from the polarity reversal time T1 has the same current value as the drive current $I_{OP}$ supplied when the polarity reversal interval $G_{PR}$ is determined to be within the threshold time TH (see FIG. 11A).

Figure 11C:
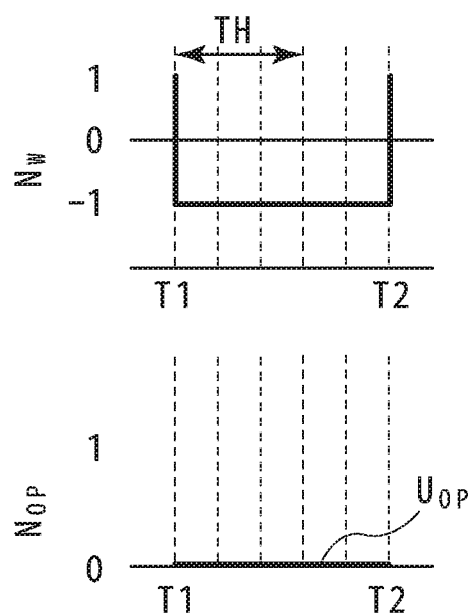

Moreover, when it is determined that the polarity reversal interval $G_{PR}$ from the polarity reversal time T1 to the polarity reversal time T2 exceeds the threshold time TH, the unit drive current waveform $U_{OP}$ corresponding to the polarity reversal interval $G_{PR}$ may be created as a unit square waveform $U_{OP}$ meaning that no drive current $I_{OP}$ is supplied during the polarity reversal interval $G_{PR}$ (see FIG. 11C).

Figure 11D:
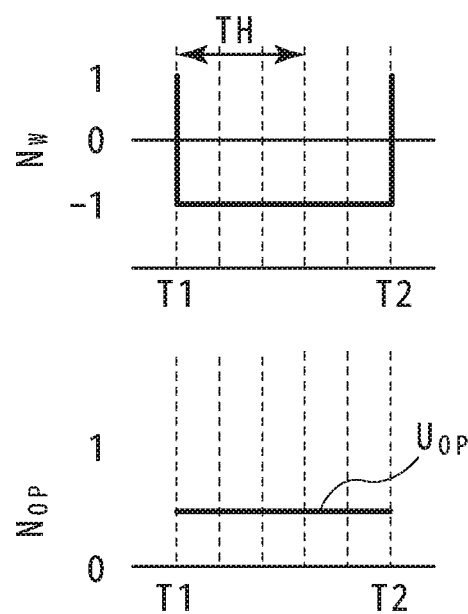

Furthermore, when it is determined that the polarity reversal interval $G_{PR}$ from the polarity reversal time T1 to the polarity reversal time T2 exceeds the threshold time TH, the unit drive current waveform $U_{OP}$ corresponding to the polarity reversal interval $G_{PR}$ may be created as a unit square waveform $U_{OP}$ meaning that a drive current $I_{OP}$ having a current value smaller than the drive current $I_{OP}$ supplied when the polarity reversal interval $G_{PR}$ is within the threshold time TH (see FIG. 11A) is supplied (see FIG. 11D).

Figure 11E:
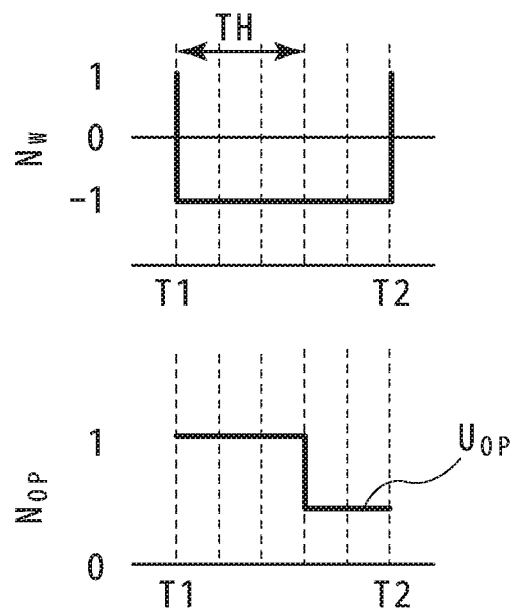

Furthermore, when the polarity reversal interval $G_{PR}$ from the polarity reversal time T1 to the polarity reversal time T2 exceeds the threshold time TH, the unit drive current waveform $U_{OP}$ corresponding to the polarity reversal interval $G_{PR}$ may be created as a unit square waveform $U_{OP}$ meaning that a drive current $I_{OP}$ is supplied during the threshold time TH from the polarity reversal time T1 defining the start point of the polarity reversal interval $G_{PR}$ and then a drive current $I_{OP}$ having a smaller current value than the drive current $I_{OP}$ supplied when the polarity reversal interval $G_{PR}$ is within the threshold time TH (see FIG. 11A) is supplied until the polarity reversal time T2 defining the end point of the polarity reversal interval $G_{PR}$ (see FIG. 11E). The drive current $I_{OP}$ supplied during the threshold time TH from the polarity reversal time T1 has the same current value as the drive current $I_{OP}$ supplied when the polarity reversal interval $G_{PR}$ is determined to be within the threshold time TH (see FIG. 11A).

Here, FIGS. 11A to 11E show a case in which unit drive current waveforms $U_{OP}$ corresponding to one polarity (negative) in the recording current waveform data $D_{WW}$ are created. Needless to say, unit drive current waveforms $U_{OP}$ corresponding to the other polarity (positive) in the recording current waveform data $D_{WW}$ can similarly be created.

As described above, a unit drive current waveform $U_{OP}$ corresponding to each polarity reversal interval $G_{PR}$ included in the recording current waveform data $D_{WW}$ is created and the unit drive current waveforms $U_{OP}$ are connected in sequence along the axis of time. As a result, the drive current waveform data $D_{OPW}$ are created (FIGS. 10B to 10E).

By controlling supply of the drive current $I_{OP}$ to the spin torque oscillator 10 according to the drive current waveform data $D_{OPW}$ (FIG. 10B) created from the unit drive current waveforms $U_{OP}$ created as shown in FIG. 11B, the magnetic field gradient of the recording magnetic field is increased when signals corresponding to relatively long polarity reversal intervals $G_{PR}$ (polarity reversal intervals $G_{PR}$ exceeding a threshold time TH) are recorded. Thus, the quality of signals can be improved.

Moreover, by controlling supply of the drive current $I_{OP}$ to the spin torque oscillator 10 according to the drive current waveform data $D_{OPW}$ (FIG. 10C) created from the unit drive current waveforms $U_{OP}$ created as shown in FIG. 11C, no drive current $I_{OP}$ is supplied to the spin torque oscillator 10 when signals corresponding to relatively long polarity reversal intervals $G_{PR}$ (polarity reversal intervals $G_{PR}$ exceeding a threshold time TH) are recorded. Thus, the power consumption of the microwave assisted magnetic head 1 can be reduced.

Furthermore, by controlling the supply of the drive current $I_{OP}$ to the spin torque oscillator 10 according to the drive current waveform data $D_{OPW}$ (FIG. 10D) created from the unit drive current waveforms $U_{OP}$ created as shown in FIG. 11D, the oscillation state of the spin torque oscillator 10 can be maintained at the polarity reversal time defining the end point of the polarity reversal interval $G_{PR}$ when signals corresponding to relatively long polarity reversal intervals $G_{PR}$ (polarity reversal intervals $G_{PR}$ exceeding a threshold time TH) are recorded. Thus, upon recording a signal corresponding to the next polarity reversal interval $G_{PR}$, particularly when the next polarity reversal interval $G_{PR}$ is equal to or shorter than the threshold time TH, delay of the oscillation of the spin torque oscillator 10 can be suppressed, whereby the quality of the signal can further be improved.

Furthermore, by controlling supply of the drive current $I_{OP}$ to the spin torque oscillator 10 according to the drive current waveform data $D_{OPW}$ (FIG. 10E) created from the unit drive current waveforms $U_{OP}$ created as shown in FIG. 11E, the magnetic field gradient of the recording magnetic field is increased when signals corresponding to relatively long polarity reversal intervals $G_{PR}$ (polarity reversal intervals $G_{PR}$ exceeding a threshold time TH) are recorded. Thus, the quality of the signals can be improved. Moreover, the oscillation state of the spin torque oscillator 10 can be maintained at the polarity reversal time defining the end point of the polarity reversal interval $G_{PR}$. Thus, upon recording a signal corresponding to the next polarity reversal interval $G_{PR}$, delay of the oscillation of the spin torque oscillator 10 can be suppressed, whereby the quality of the signal can further be improved.

Based on the recording current waveform data $D_{WW}$ created as described above, the recording current supply part 91a generates a recording current $I_W$ and supplies it to the first coil 9a and second coil 9b. Concurrently, based on the drive current waveform data $D_{OPW}$, the drive current supply part 91b generates a drive current $I_{OP}$ and supplies it to the spin torque oscillator 10. As a result, when a recording magnetic field is applied to the magnetic disc 100 in accordance with a polarity reversal interval $G_{PR}$ equal to or shorter than a threshold time TH, a microwave magnetic field generated from the spin torque oscillator 10 is applied to the magnetic disc 100 in a superimposed manner on the recording magnetic field, whereby the signal can be recorded with a high SN ratio. On the other hand, when a recording magnetic field is applied to the magnetic disc 100 in accordance with a polarity reversal interval $G_{PR}$ exceeding the threshold time TH, generation of a microwave magnetic field from the spin torque oscillator 10 is suppressed, whereby it is possible to prevent substantial deterioration in the quality of signals recorded on the magnetic disc 100.

As described above, in the magnetic recording device according to this embodiment, signals corresponding to polarity reversal intervals $G_{PR}$ equal to or shorter than a threshold time TH (relatively short polarity reversal intervals $G_{PR}$) can be recorded with high SN ratios with the assist effect of a microwave magnetic field generated from the spin torque oscillator 10. On the other hand, signals corresponding to polarity reversal intervals $G_{PR}$ exceeding the threshold time TH (relatively long polarity reversal intervals $G_{PR}$) are not subject to substantial deterioration in quality under the influence of a microwave magnetic field generated from the spin torque oscillator 10. Thus, according to the present invention, signals corresponding to relatively long polarity reversal intervals $G_{PR}$ can be recorded with higher SN ratios than signals recorded with a microwave magnetic field continuously applied during the polarity reversal intervals $G_{PR}$ (relatively long polarity reversal intervals $G_{PR}$). Depending on the setting of the threshold time TH and the like, the SN ratios of recorded signals corresponding to relatively long polarity reversal intervals $G_{PR}$ may vary. Even in such a case, the signals can be recorded with higher SN ratios than signals recorded with a microwave magnetic field continuously applied during the relatively long polarity reversal intervals $G_{PR}$. Thus, the magnetic recording device according to this embodiment can record signals with high SN ratios without substantially lowering the quality of signals recorded on the magnetic disc 100.

The above-described embodiment is provided for easier understanding of the present invention and is not intended to restrict the present invention. Therefore, the elements disclosed in the above embodiment are deemed to include any design change and equivalents falling within the technical scope of the present invention.

In the above embodiment, the read/write channel included in the control part 230 may be used to evaluate the quality of signals recorded on the magnetic disc 100 and create feedback information including information regarding the threshold time TH based on the quality evaluation results. In other words, the magnetic recording device may comprise a signal quality evaluation part evaluating the quality of signals recorded on the magnetic disc 100, and a feedback information generation part generating feedback information to feed back to the current control part 90. In such a case, information regarding the threshold time TH included in the feedback information can be, for example, information regarding the threshold time TH changed based on the signal quality evaluation results. The magnetic recording device in this embodiment presets a given threshold time TH and taking into consideration as an indicator whether a polarity reversal interval $G_{PR}$ in the recording current waveform data $D_{WW}$ exceeds the threshold time TH, creates the drive current waveform data $D_{OPW}$. If the threshold time TH is properly set, there is no problem. However, if it is improperly set, the quality of signals recorded with a drive current $I_{OP}$ applied to the spin torque oscillator 10 according to the drive current waveform data $D_{OPW}$ may be lowered. For example, when the quality of a signal recorded according to a polarity reversal interval $G_{PR}$ is lowered even though the polarity reversal interval $G_{PR}$ is determined to be within the threshold time TH and a drive current $I_{OP}$ is supplied during the polarity reversal interval $G_{PR}$, the threshold time TH should presumably be reset for a shorter time. In such a case, the feedback information generation part generates feedback information including information regarding a changed, shorter threshold time TH and outputs it to the current control part 90. The current control part 90 changes the threshold time TH based on the feedback information and creates the drive current waveform data $D_{OPW}$ using the changed threshold time TH. As a result, deterioration in quality of recorded signals can more effectively be prevented.

EXAMPLES

The present invention will be described in more detail using an experimental example. However, the present invention is not restricted to the following experimental example in any way.

Example 1

Figure 13:
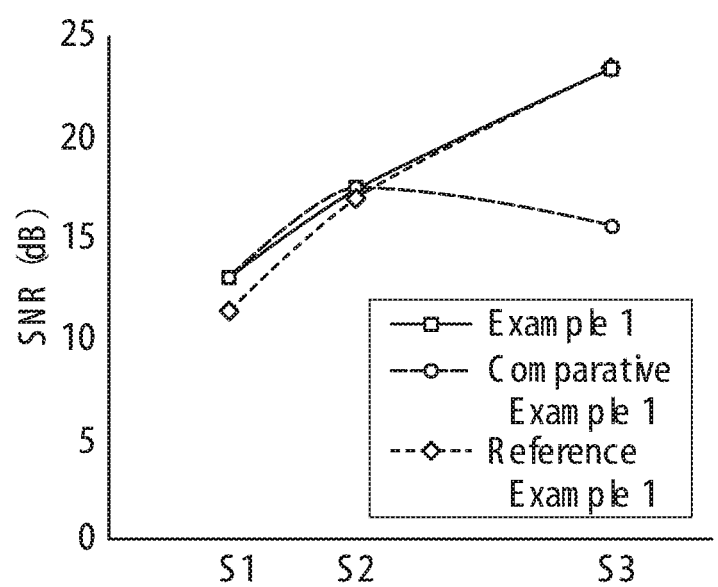
FIG. 13 is a graph showing the results of measuring the SN ratios of reproduced signals in the example.

Using the magnetic recording device having the configuration shown in FIGS. 1 to 9, signals were recorded on a magnetic disc, the signals were read with the reproducing head 1A of the microwave assisted head 1, and the SN ratios (dB) of the reproduced signals were measured. The results are shown in FIG. 13.

Figure 10B:
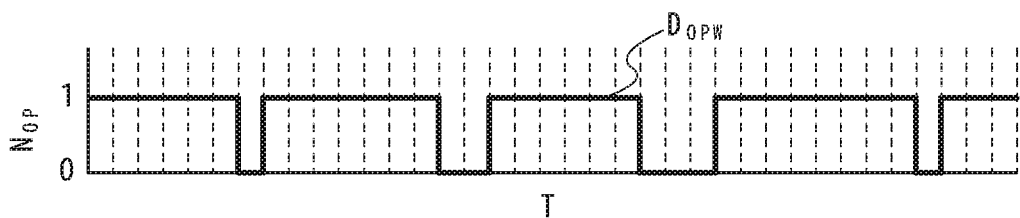
FIGS. 10B to 10E are each an output waveform chart showing an example of the drive current waveform data created by the current control part.
Figure 10C:
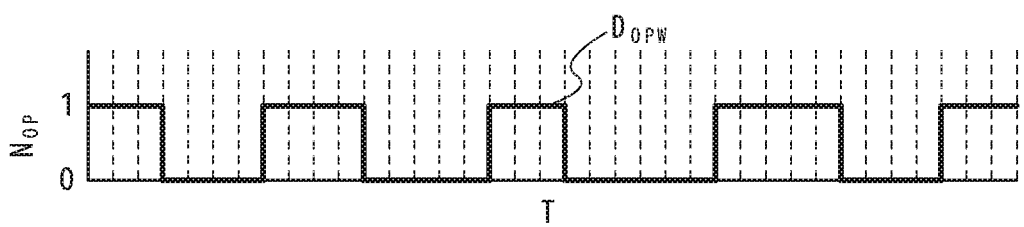
Figure 10D:
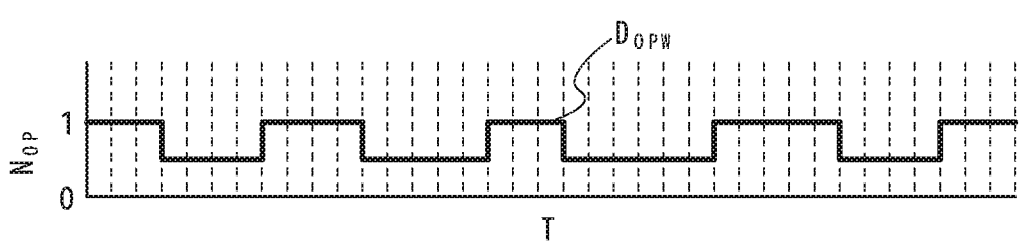
Figure 10E:
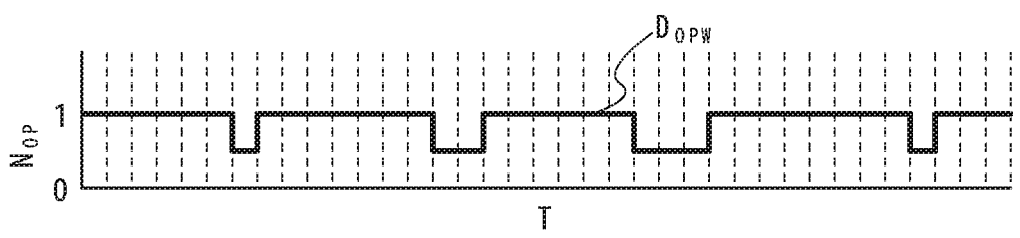

Here, upon recording signals, the recording current waveform data $D_{WW}$ as shown in FIG. 10A were created based on the signals to record, the unit drive current waveforms $U_{OP}$ were created as shown in FIGS. 11A and 11B, and the drive current waveform data $D_{OPW}$ as shown in FIG. 10B were created. The signals recorded on a magnetic disc included a signal S1 corresponding to a relatively short polarity reversal interval $G_{PR1}$, a signal S3 corresponding to a relatively long polarity reversal interval $G_{PR3}$, and a signal S2 corresponding to a polarity reversal interval $G_{PR2}$ in-between. The relationship between the threshold time TH for creating the drive current waveform data $D_{OPW}$ and the polarity reversal intervals $G_{PR1}$ to $G_{PR3}$ corresponding to the signals S1 to S3 are as follows.

$G_{PR1} < G_{PR2} < TH < G_{PR3}$

The unit drive current waveforms $U_{OP}$ corresponding to the polarity reversal intervals $G_{PR1}$ and $G_{PR2}$ were created as shown in FIG. 11A. The unit drive current waveform $U_{OP}$ corresponding to the polarity reversal interval $G_{PR3}$ was created as shown in FIG. 11B.

Comparative Example 1

Signals were recorded on a magnetic disc in the same manner as in Example 1 except that a drive current $I_{OP}$ having the current value as shown in FIG. 11A was continuously applied while recording the signals. The signals were read with the reproducing head 1A of the microwave assisted head 1, and the SN ratios (dB) of the reproduced signals were measured. The results are shown in FIG. 13.

Reference Example 1

Signals were recorded on a magnetic disc in the same manner as in Example 1 except that no drive current $I_{OP}$ was applied while recording the signals. The signals were read with the reproducing head 1A of the microwave assisted head 1, and the SN ratios (dB) of the reproduced signals were measured. The results are shown in FIG. 13.

FIG. 13 is a graph showing the SN ratios (dB) of the signals S1 to S3. The results shown in FIG. 13 confirmed that it is possible to improve the SN ratio of the signal S1 corresponding to a relatively short polarity reversal interval $G_{PR}$ and prevent deterioration in quality of the signal S3 corresponding to a relatively long polarity reversal interval $G_{PR3}$ by controlling supply of the drive current $I_{OP}$ according to the length of the polarity reversal interval $G_{PR}$ in the recording current waveform data $D_{WW}$ based on the signals to be recorded as in Example 1.

The invention claimed is:
1. A magnetic recording device, comprising:
a magnetic recording medium;
a microwave assisted magnetic head having a main magnetic pole for generating a recording magnetic field to apply to the magnetic recording medium while recording signals on the magnetic recording medium, and a spin torque oscillator provided near the main magnetic pole for generating a microwave magnetic field to apply to the magnetic recording medium in a superimposed manner on the recording magnetic field;
a recording current supply part for supplying a recording current for generating the recording magnetic field from the main magnetic pole to recording coils for exciting the main magnetic pole according to recording current waveform data created based on the signals;
a drive current supply part for supplying a drive current to the spin torque oscillator; and
a drive current control part for controlling a supply of the drive current by the drive current supply part based on the recording current waveform data, wherein
the drive current control part controls the supply of the drive current by the drive current supply part to not substantially lower a quality of the signals recorded on the magnetic recording medium considering as an indicator whether a polarity reversal interval included in the recording current waveform data and defined as a time from one polarity reversal to a next polarity reversal exceeds a threshold time.
2. The magnetic recording device according to claim 1, wherein when the polarity reversal interval included in the recording current waveform data exceeds the threshold time, the drive current control part controls the supply of the drive current by the drive current supply part so that the microwave magnetic field is generated from the spin torque oscillator during the threshold time from a polarity reversal defining a start point of the polarity reversal interval.

3. The magnetic recording device according to claim 1, wherein when the polarity reversal interval included in the recording current waveform data exceeds the threshold time, the drive current control part controls supply of the drive current by the drive current supply part so that the microwave magnetic field is not generated from the spin torque oscillator from a polarity reversal defining a start point of the polarity reversal interval to a polarity reversal defining an end point of the polarity reversal interval.

4. The magnetic recording device according to claim 1, wherein when the polarity reversal interval included in the recording current waveform data exceeds the threshold time, the drive current control part controls the supply of the drive current by the drive current supply part so that a current value of the drive current supplied by the drive current supply part is lower than a current value of the drive current supplied by the drive current supply part when the polarity reversal interval is equal to or shorter than the threshold time from a polarity reversal defining a start point of the polarity reversal interval to a polarity reversal time defining an end point of the polarity reversal interval.

5. The magnetic recording device according to claim 1, wherein when the polarity reversal interval included in the recording current waveform data exceeds the threshold time, the drive current control part controls the supply of the drive current by the drive current supply part so that the microwave magnetic field is generated by the spin torque oscillator during the threshold time from a polarity reversal defining a start point of the polarity reversal interval, and controls the supply of the drive current by the drive current supply part so that a current value of the drive current supplied by the drive current supply part is lower than a current value of the drive current supplied by the drive current supply part when the polarity reversal interval is equal to or shorter than the threshold time until a polarity reversal defining an end point of the polarity reversal interval when the threshold time has ended.

6. The magnetic recording device according to claim 1, wherein the microwave assisted magnetic head further includes a trailing shield forming a magnetic path together with the main magnetic pole,
the spin torque oscillator is provided in a write gap between the main magnetic pole and trailing shield, and
the threshold time is one to three times a time for one recording bit on the magnetic recording medium to shift over a distance corresponding to the write gap.

7. The magnetic recording device according to claim 1, further comprising:
a signal quality evaluation part for evaluating quality of signals recorded on the magnetic recording medium; and
a feedback information generation part for generating feedback information to feed back to the drive current control part based on evaluation by the signal quality evaluation part, wherein the feedback information generation part changes the threshold time based on the evaluation by the signal quality evaluation part and generates the feedback information including information regarding the changed threshold time.

8. A magnetic recording method for recording signals on a magnetic recording medium using a microwave assisted magnetic head having a main magnetic pole generating a recording magnetic field to apply to the magnetic recording medium while recording signals on the magnetic recording medium, and a spin torque oscillator provided near the main magnetic pole for generating a microwave magnetic field to apply to the magnetic recording medium in a superimposed manner on the recording magnetic field, comprising: a step of supplying a recording current for generating the recording magnetic field from the main magnetic pole to recording coils for exciting the main magnetic pole according to recording current waveform data created based on the signals; and
a step of supplying a drive current to the spin torque oscillator,
wherein in the step of supplying a drive current, the drive current is controlled so as not to substantially lower a quality of signals recorded on the magnetic recording medium considering as an indicator whether a polarity reversal interval included in the recording current waveform data and defined as a time from one polarity reversal to the next polarity reversal exceeds a threshold time.

9. The magnetic recording method according to claim 8, wherein when the polarity reversal interval included in the recording current waveform data exceeds the threshold time, the drive current is controlled so that the microwave magnetic field is generated from the spin torque oscillator during the threshold time from a polarity reversal defining a start point of the polarity reversal interval.

10. The magnetic recording method according to claim 8, wherein when the polarity reversal interval included in the recording current waveform data exceeds the threshold time, the drive current is controlled so that the microwave magnetic field is not generated from the spin torque oscillator from the polarity reversal defining a start point of the polarity reversal interval to a polarity reversal defining an end point of the polarity reversal interval.

11. The magnetic recording method according to claim 8, wherein when the polarity reversal interval included in the recording current waveform data is equal to or shorter than the threshold time, the drive current having a given current value is supplied to the spin torque oscillator from the polarity reversal time defining a start point of the polarity reversal interval to a polarity reversal time defining an end point of the polarity reversal interval, and
when the polarity reversal interval exceeds the threshold time, the drive current having a current value lower than a current value of the drive current supplied when the polarity reversal is equal to or shorter than the threshold time is supplied to the spin torque oscillator from a polarity reversal time defining a start point of the polarity reversal interval to a polarity reversal time defining an end point of the polarity reversal interval.

12. The magnetic recording method according to claim 8, wherein when the polarity reversal interval included in the recording current waveform data exceeds the threshold time, the drive current is supplied to the spin torque oscillator so that the microwave magnetic field is generated from the spin torque oscillator during the threshold time from a polarity reversal time defining a start point of the polarity reversal interval, and the drive current having a current value lower than the current value of the drive current supplied when the polarity reversal interval is equal to or shorter than the threshold time is supplied to the spin torque oscillator until a polarity reversal time defining the end point of the polarity reversal interval when the threshold time has ended.

13. The magnetic recording method according to claim 8, wherein the microwave assisted magnetic head further includes a trailing shield forming a magnetic path together with the main magnetic pole, the spin torque oscillator is provided in a write gap between the main magnetic pole and trailing shield, and the threshold time is one to three times a time for one recording bit on the magnetic recording medium to shift over a distance corresponding to the write gap.

14. The magnetic recording method according to claim 8, further comprising:

a step of evaluating quality of signals recorded on the magnetic recording medium; and a step of generating feedback information regarding control of the drive current based on the evaluation of the evaluating step, wherein the feedback information includes information regarding the threshold time changed based on the evaluation.

* * * * *